(12) United States Patent
Scheil et al.

(10) Patent No.: US 11,124,866 B2
(45) Date of Patent: Sep. 21, 2021

(54) METHOD OF TREATING THE SURFACES OF MOULD PARTS FOR CASTING MOULDS CONSISTING OF A STEEL MATERIAL

(71) Applicant: Nemak, S.A.B. de C.V., Garcia (MX)

(72) Inventors: Jan Scheil, Darmstradt (DE); Christoph Viechtbauer, Bad Soden am Taunus (DE); Ugis Groza, Vienna (AT); Christoph Lechner, Vienna (AT); Friedrich Bleicher, Vienna (AT)

(73) Assignee: Nemak, S.A.B. de C.V., Garcia (MX)

( * ) Notice: Subject to any disclaimer, the term of this patent is extended or adjusted under 35 U.S.C. 154(b) by 0 days.

(21) Appl. No.: 16/765,214

(22) PCT Filed: Nov. 20, 2018

(86) PCT No.: PCT/IB2018/059121
§ 371 (c)(1),
(2) Date: May 19, 2020

(87) PCT Pub. No.: WO2019/097496
PCT Pub. Date: May 23, 2019

(65) Prior Publication Data
US 2020/0283883 A1   Sep. 10, 2020

(30) Foreign Application Priority Data
Nov. 20, 2017   (DE) .................... 10 2017 127 299.2

(51) Int. Cl.
*C23C 8/26* (2006.01)
*B22C 9/06* (2006.01)
(Continued)

(52) U.S. Cl.
CPC ................ *C23C 8/26* (2013.01); *B22C 9/061* (2013.01); *B23P 9/04* (2013.01); *C23C 8/38* (2013.01); *C23C 8/50* (2013.01); *C23C 8/80* (2013.01)

(58) Field of Classification Search
CPC .... C23C 8/38; C23C 8/36; C23C 8/50; C23C 8/80; C23C 8/26; B23P 9/04; B22D 17/2209; B22C 9/061; C21D 7/04
See application file for complete search history.

(56) References Cited

U.S. PATENT DOCUMENTS
2008/0308199 A1   12/2008   Locker

FOREIGN PATENT DOCUMENTS
CN   101237957 A   8/2008
CN   102618820 A   8/2012
(Continued)

OTHER PUBLICATIONS

Steitz et al., "Effect of Process Parameters on Surface Roughness in Hammer Peening and Deep Rolling", Key Engineering Materials, Jun. 13, 2013, pp. 1887-1901, vols. 554-557.

*Primary Examiner* — Jessee R Roe
(74) *Attorney, Agent, or Firm* — The Webb Law Firm

(57) ABSTRACT

With the method according to the invention, mould parts for casting moulds for light metal casting can be treated such that the danger of crack formation in the region of the surface sections of the mould part coming into contact with the light metal melt during casting is reduced to a minimum. This is achieved in that by means of nitriding treatment on the mould part a nitride-hardened edge layer adjoining its free surface is generated which is harder than the inner core region of the mould part and comprises a diffusion layer adjoining the core region and a compound layer located on the diffusion layer and adjoining the free surface of the mould part and in that at least one section of the surface of (Continued)

the mould part is mechanically processed by machine hammer peening, in the case of which a hammer tool, which, at a certain impact frequency, carries out an impact movement along a movement axis which is aligned in relation to the free surface at a certain acute angle, is guided continuously over the free surface of the mould part following a track determined in a preceding design step such that the compound layer is removed by the impacting stress in the impact region of the hammer tool.

15 Claims, 9 Drawing Sheets

(51) Int. Cl.
*B23P 9/04* (2006.01)
*C23C 8/38* (2006.01)
*C23C 8/50* (2006.01)
*C23C 8/80* (2006.01)

(56) References Cited

FOREIGN PATENT DOCUMENTS

| | | |
|---|---|---|
| DE | 19946957 C1 | 2/2001 |
| DE | 102009025621 A1 | 12/2010 |
| EP | 2484493 A1 | 8/2012 |

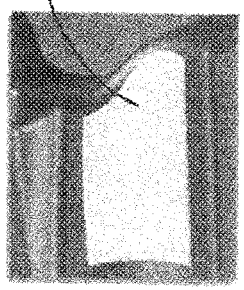
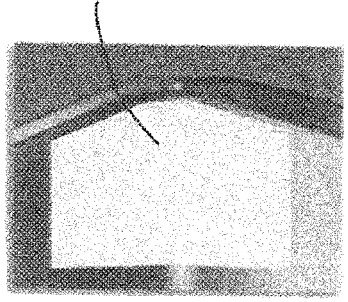
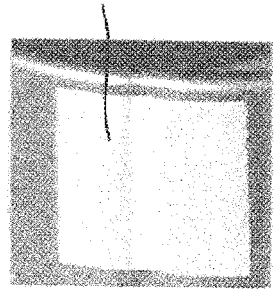
Fig. 2a     Fig. 2b     Fig. 2c
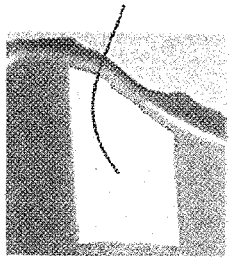
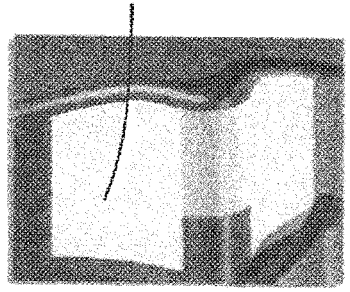
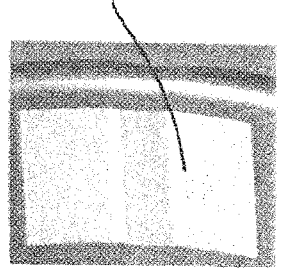
Fig. 2d     Fig. 2e     Fig. 2f
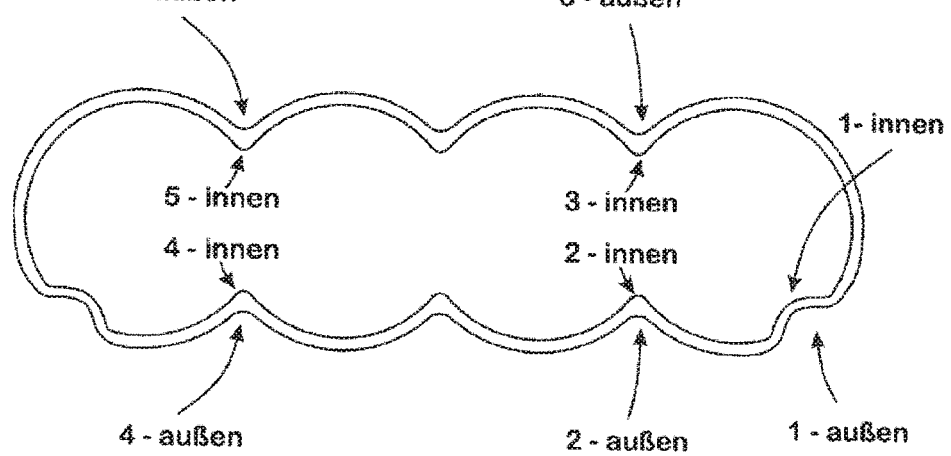
Fig. 3

METHOD OF TREATING THE SURFACES OF MOULD PARTS FOR CASTING MOULDS CONSISTING OF A STEEL MATERIAL

CROSS-REFERENCE TO RELATED APPLICATIONS

This application is the United States national phase of International Application No. PCT/IB2018/059121 filed Nov. 20, 2018, and claims priority to German Patent Application No. 10 2017 127 299.2 filed Nov. 20, 2017, the disclosures of which are hereby incorporated by reference in their entirety.

BACKGROUND OF THE INVENTION

Field of the Invention

The invention relates to a method of treating the surfaces of mould parts for casting moulds consisting of a steel material, which are provided for the casting-related manufacture of cast parts from a light metal melt. In the case of casting moulds, in which such mould parts are used, they are in particular permanent casting moulds, as are for example used in pressure casting processes.

Description of Related Art

In the case of the manufacture of cast parts made from light metal melts, the mould parts of the casting mould are exposed to high thermal alternating stresses. Therefore, the mould parts are usually manufactured from hot work steels which, owing to their composition and the process steps carried out for their production and processing, have a high resistance to the thermal stress occurring during the casting operation owing to the frequent change of heating and cooling.

Typical examples of hot work steels, which are used for the manufacture of mould parts for pressure casting moulds, are the steels standardised under the material numbers 1.2343 (AISI designation H11), 1.2344 (AISI designation "H13") or 1.2340 (also known under the designation "E38K").

In addition to the thermal stresses, the mould parts of casting moulds shaped from steel material are subject to the danger of highly abrasive wear in the region of their surfaces coming directly into contact with the respectively cast metal melt.

In order to also toughen the mould parts in this respect such that they achieve a long useful life in spite of the stresses acting on them during use, the mould parts are generally subjected to a treatment, whose aim is to increase the hardness and therefore the resistance to wear and crack formation in an edge layer of the mould part adjoining the surface of the mould part. In contrast, the core region of the mould part should retain sufficient toughness in order to withstand the thermal and mechanical stresses occurring during use.

Different methods are available for surface hardening. These include gas nitriding, carbonitriding, nitrocarburising and plasma nitriding. Each of these nitriding methods is based on the fact that the edge layer to be hardened is enriched with nitrogen, and enrichment with carbon possibly also taking place at the same time.

The nitrogen atoms diffusing from the surfaces of the respective mould part in the steel material form, with the alloying elements present there, such as for example aluminium, chromium, molybdenum, vanadium or titanium, nitrides which are characterised by high hardness. In this manner, a near-surface diffusion layer develops, which, owing to the presence of the nitrides, has an increased hardness compared to the core material. In this case, the diffusion layer on the surface of the mould part is covered by a compound layer consisting of compounds of the components of the steel material with nitrogen, in particular iron nitrides. This compound layer is often designated in technical literature as a white layer. The diffusion layer adjoining the core material of the mould part and the compound layer located on the diffusion layer and adjoining the free surface of the mould part together form the nitride-hardened edge layer. The compound layer in the case of mould parts, which are edge layer-hardened by gas nitriding, occurs in a particularly noticeable manner.

In practice, gas nitriding has in particular been found to be a comparably cost-effective option for nitride hardening. In the case of gas nitriding, the mould parts to be hardened are kept at a temperature of typically 500° C. under a $NH_3$-containing atmosphere. Atomic nitrogen is split off from this atmosphere, which is diffused into the mould part surface. In the case of mould parts, which consist of the above-mentioned hot work steels, edge layers that are nitride-hardened can be produced in this manner with a thickness of typically 0.1-0.4 mm, wherein the thickness of the compound layer is typically in the region of 50 μm.

It is known from WO 2011/142479 A1 that the compound layer can cause heat cracks and wear on the mould. In order to remove the compound layer, WO 2011/142479 A1 proposes that the respective mould part firstly be edge layer-hardened in a gas nitriding process. The 2-7 μm thick compound layer resulting in this case is then removed by the ammonia gas used for the gas nitriding being drawn out of the nitriding furnace and an atmospheric gas being guided into the furnace in order to perform a thermal treatment to break down the nitrogen compound. A shot blasting treatment is then carried out in order to also mechanically remove the compound layer.

A compound layer ("white layer") present on a nitride-hardened casting sink is also removed by shot blasting in the case of the prior art known from EP 2 484 493 A1.

In DE 199 46 957 C1, a further possibility for removing coatings on a metallic substrate consisting of in particular steel material, the so-called "needling" has been proposed. In the case of needling, the respective surface is processed with the tips of a number of needles, which periodically act on the coating located on the respective substrate and thus abrasively remove it. The needles consisting of hardened steel are axially mounted in a hand-held device and impact generally pneumatically driven at a high frequency on the surface to be processed. The material removal should be particularly effectively and carefully carried out by subjecting the surface to be processed to a cold treatment, for example by irradiating with liquid $CO_2$ simultaneously to the needle processing. The derusting of hulls is mentioned as exemplary applications of needling, for which blasting with sand, dry ice or balls is too time-consuming owing to the blasting abrasive to be collected and disposed of in this case (see also https://de.wikipedia.org/wiki/Nadelentroster). More or less loose rust coatings consisting of iron oxide and located on a component cannot be compared with compound layers, as they develop in the case of mould parts for casting moulds in the course of nitride hardening by depositing nitrogen into the respective steel substrate and the associated nitrogen compounds forming on the surface of the nitride-hardened component.

Practical experiences have shown that in the case of mould parts of casting moulds, in which light metal melts, in particular melts based on aluminium, are cast, quick-developing cracks are formed in spite of their edge layer hardening which render the mould parts unusable prematurely.

Against this background, the object is set of providing a method with which mould parts for light metal casting can be treated such that the danger of crack formation in the region of the surface sections of the mould part coming into contact with the light metal melt during casting is reduced to a minimum.

SUMMARY OF THE INVENTION

In the case of the method according to the invention of treating the surfaces of mould parts of casting moulds consisting of a steel material, which are provided for the casting-related manufacture of cast parts made from a light metal melt, at least the following work steps are thus carried out:

a) Nitrate treating the mould part to generate a nitride-hardened edge layer adjoining the free surface of the mould part which has a greater hardness than the inner core region of the mould part and comprises a diffusion layer adjoining the core region and a compound layer located on the diffusion layer and adjoining the free surface of the mould part;

b) mechanical processing of at least one section of the free surface of the mould part, with the mechanical processing being carried out by machine surface hammering, in the case of which a hammer tool, which performs an impact movement along a movement axis at a certain impact frequency, said movement axis being aligned in relation to the free surface at a determined acute angle, is guided continually over the free surface of the mould part following a track determined in a preceding design step such that the compound layer is removed by the impact stress in the impact region of the hammer tool.

The invention therefore uses the possibility known per se of increasing the hardness of a mould part for pressure cast moulding by nitride treatment in a near-surface edge region of the mould part such that the essential requirement for improved wear resistance is provided.

Essentially, the nitriding treatment provided according to the invention (work step a)) can be carried out with any suitable nitriding method known from practice. To this end, the conventional bath nitriding or plasma nitriding methods already mentioned above are for example made available.

From cost viewpoints and from a process perspective, it has been proven particularly effective for the nitriding treatment to be carried out in work step a) of the method according to the invention in a manner known per se as gas nitriding, in the case of which the respectively treated mould part is held at a suitable temperature under a nitrogen-containing atmosphere. The nitriding treatment provided in each case is not subject to restrictions, but rather can be carried out in any manner known for this purpose.

The invention is based on the knowledge that the compound layer is prone to the formation of microcracks, which form the starting point for the development of cracks in the nitride-hardened edge layer and the resulting infiltration of the edge layer by casting metal, by means of which the crack development is accelerated.

In order to avoid this danger, the invention provides for mechanical processing of at least the sections of the free surface of the mould part coated with the compound layer, on which intensive contact between melt and mould part results when casting the metal melt into the casting mould and which are particularly at risk of cracking in this respect. The mechanical processing consists of machine surface hammering, usually referred to in technical jargon as "machine hammer peening" (MHP) which is carried out such that the compound layer is largely fully removed at least in the impact region of the hammer tool used for the processing.

The machine hammer peening usually serves to smoothen and harden surfaces of metallic components. To this end, a hard metal ball is accelerated cyclically against the surface to be processed. Plastic deformations result on the surface through the impact of the ball. The associated strain hardening leads to internal compressive stresses under the surface to be treated. The hard metal ball is usually carried by a plunger via which it is electro-magnetically, pneumatically or piezoelectrically accelerated. The Hertzian stress acting on the processed surface at the time of impact of the hard metal ball is determined by the ball diameter. At the same time, the forces acting on the surface upon impact can be controlled by setting the speed of the hard metal ball, the stroke covered by the ball in the case of one impact or the impact frequency. Similarly, the deformation energy introduced into the processed surface and therefore the pressure stresses generated there can be influenced via the distance between the tracks followed by the hammer tool during the processing.

The ball usually used as the impact tool for machine hammer peening typically consists of a hard metal such as a carbide material, such as for example WC-Co or the like. Such ball inserts consisting of carbide material and particularly suitable for the purposes according to the invention typically have a hardness of at least 2000 HV and are in this manner capable of transferring high impact energy to the notably less hard surface to be processed and deforming them without themselves being deformed when doing so. This allows energy inputs of typically at least 63 mJ to be achieved upon impact on the surface processed in each case by means of hard metal ball tools provided in this manner. This energy input is more than sixty times greater than the energy input which can typically be achieved with conventional shot peening with balls consisting of steel or even in the case of "needling" also explained above.

The tool formed by the plunger and the hard metal ball is guided over the workpiece surface in a meandering manner during the hammer processing. In order to be able to control the high forces occurring during the hammer processing and ensure a systematic movement of the tool, machine assistance is required for the movement of the tool. Therefore, the hammer tool is usually moved by means of a robot or by means of a compound slide drive known from tool machines.

It is therefore characteristic of the surface hammer peening used according to the invention that it allows the systematic, controlled processing of the respective surface according to a predefined pattern by means of a specific variation of the previously explained parameters such that precisely reproducible work results can be achieved.

In this respect, it is particularly significant that in the case of the method according to the invention, the movement axis, along which the hammer tool performs its impact movement, is not aligned perpendicular, but rather aligned in relation to the section of the free surface, to be processed in each case, of the mould part such that between the free surface and the movement axis of the hammer tool an acute angle, i.e. an angle smaller than 90°, is formed.

As can be understood from the FIGS. 4a-4c and 9a-9c, the acute angle to be maintained according to the invention can be specified as the so-called "tilt angle". The "tilt angle" ("βt") is designated as the angular dimension between the surface normal FN established on the workpiece surface in the contact point B with the hammer head 11 and the movement axis X of the stroke movement of the hammer head 11 in the plane "travel direction-surface normal" E_VF. The alignment of the movement axis X is selected here such that the processing takes place along the travel direction VR in the direction of the processed material, i.e. "slowly" (see FIG. 4b, 9a).

The acute angle to be maintained according to the invention between the movement axis X and the workpiece surface O to be processed can, however, also be defined as the "working angle" ("βa"). The working angle βa is the angular dimension between the surface normal FN of the workpiece surface O in the contact point B with the hammer head 11 and the axis X of the stroke movement of the hammer head 11 in the plane E_QV transverse to the travel direction VR. The angular dimension is also selected here such that slow processing is carried out, i.e. working angles βa are set which are greater than "0" (see FIG. 4a, 9b).

Lastly, the acute angle to be maintained according to the invention between the movement axis X of the hammer tool (hammer head 11) and the workpiece surface O to be processed can—preferably—also be the "impact angle" ("βi"). The impact angle βi designates the smallest possible angular dimension between the surface normal FN of the workpiece surface O in the contact point B with the hammer head 11 and the axis X of the stroke movement of the hammer head 11 as a combination of tilt angle βt and working angle βa (see FIG. 4c, 9c).

Practical tests have confirmed that in the case of such an oblique alignment of the hammer tool, the compound layer jumps up in the impact region of the tool in a scale- or flake-shaped manner from the surface. In this manner, the compound layer can be largely completely removed in a highly efficient manner in the regions of the mould part critical with respect to the crack formation.

Typically, for this purpose, the respective angle formed by the movement axis of the hammer tool with a surface normal established on the section of the free surface of the mould part processed in each case is at least 10°, with a maximum angle of 50° being proven to be effective. It has been proven to be particularly favourable in this respect when the angle between the free surface of the respectively processed section of the mould part and the movement axis of the hammer tool is at least 15°, with an angle of at least 20° having been proven particularly effective. In this case, it has also been proven advantageous with respect to optimising the effectiveness of the surface treatment for the angle in question between the surface normal and the movement axis to be limited to at most 45°.

In the case where the working angle βa or the impact angle βi are selected as the acute angle, to be maintained according to the invention, of the alignment of the movement axis of the hammer tool in relation to the surface to be processed in each case, working angles βa or impact angles βi of respectively >25° to 45° have proven reliable. If, in contrast, the tilt angle βt is used as the angle, to be set according to the invention, of the alignment of the movement axis in relation to the surface to be processed in each case, tilt angles βt of >20° to 45° have proven to be reliable. Accordingly, the movement axis of the stroke movement performed by the hammer tool during the impact processing is optimally set such that the following applies:

$$20° < \beta t \leq 45°$$

$$25° < \beta a \leq 45°$$

$$25° < \beta i \leq 45°$$

Optimal results of the MHP treatment carried out according to the invention are generally obtained when the angle between the movement axis of the tool and the surface normal established on the surface section of the mould part processed in each case is 30°±7°, in particular 30°±5°.

However, not only is the compound layer present there removed by the MHP processing carried out according to the invention in the section of the surface of the mould part processed in each case, but cold forming and therefore additional strain hardening of the near-surface region, impacted by the hammer tool, of the nitride-hardened edge layer of the mould part is also achieved. This strain hardening also contributes to the resistance of the hardened edge layer to abrasive, thermal and other mechanical stresses of the mould part taking place during the change in its section processed according to the invention in each case and also contributes to the crack resistance of the mould part. At the same time, the internal compressive stresses in the near-surface region of the mould part are increased by the MHP processing provided according to the invention, whereby in turn the fatigue strength of the mould part is also notably improved. In this case, increases in the internal compressive stresses by the MHP treatment according to the invention of up to 800 MPa can be achieved, with the minimum value of the increase in internal compressive stresses typically being at least 100 MPa in the case of an approach according to the invention.

An essential advantage of the use according to the invention of machine hammer peening (MHP) compared to other methods known per se for removing layers adhered to the surface of workpieces is that it is possible with this processing method to targetedly design the impact parameters and the process development with respect to an optimal processing result.

The energy acting in the impact region on the layer to be removed can be precisely designed by setting a certain impact frequency, by selecting a certain form or mass of the hammer tool, by selecting a certain travel speed of the hammer tool along the respective track, by selecting the strokes of the impact movement carried out by the hammer tool or by selecting the distance of the impressions generated by the hammer tool in the region of its impact region into the surface of the mould part such that, on the one hand, the region of the compound layer impacted by the hammer tool chips off reliably from the mould part, but, on the other hand, the desired strain hardening and increase of the internal compressive stress is also achieved. In this case, it goes without saying that the parameters of the impact processing carried out according to the invention can be optimised such that the achieved strain hardening or increase of the internal compressive stress receives less priority than maximum removal of the compound layer, i.e. can approach "zero".

Impact frequencies of 20-500 Hz, in particular 100-500 Hz and strokes of up to 2 mm have been proven to be expedient in practice, with this including the possibility of the practically measurable stroke being equal to "0" because the respective hammer system works with pretensions such that the hammer impacting on the surface to be processed practically does not carry out any impact stroke.

Impression distances of the impressions generated by the hammer tool on the free surface of more than 0 mm to 1 mm, in particular at least 0.05 mm have been proven for the processing according to the invention.

The impact surface, with which the hammer tool impacts the mould part, can be bulged spherically in a manner known per se. Typically, the diameter of the spherical section on which the impact surface of the hammer tool is formed, is 2-30 mm.

The moving mass of the hammer tool impacting on the processed surface section in each case is typically in the range of 10-500 g.

The travel speed, with which the hammer tool is guided along the previously determined track in the case of the MHP processing according to the invention, is also typically in the range of 400-6000 mm/min.

Similar to the previously explained parameters of the impact processing, the progress of the impact processing can be precisely planned in the case of the method according to the invention. The hammer tool thus follows a pre-planned track in the case of MHP. This can be systematically guided such that the surface section to be processed in each case has been processed within a minimised time at each point by the tool. In this manner, spatially curved surface sections can also be freed from the compound layer adhering thereto in a time-saving and highly-effective manner. One example of such track guidance is a track which runs in the manner of a meander pattern or spiral pattern over the section of the surface of the mould part to be processed. However, other track patterns, such as a spiral course or a course in parallel aligned lines, in the case of which the tool is lifted from the mould part after each continuously performed track line and is then placed offset on the mould part again for a new track line that is then in turn continuously carried out.

Examples of the application of MHPs and the parameters set in this case can be found at various points in the technical literature. Examples of this are the article by Krall et al. "Robot based machine hammer peening using an electromagnetic driven hammering device", (2015), 10.2507/26th.daaam.proceedings.086, the article "Mechanism of surface modification using machine hammer peening technology" by F. Bleicher, C. Lechner, C. Habersohn, E. Kozeschnik, B. Adjassoho, H. Kaminski, CIRP Annals—Manufacturing Technology 61 (2012) 375-378, also published in Annals of DAAAM for 2012 & Proceedings of the 23rd International DAAAM Symposium, Volume 23, No. 1, ISSN 2304-1382 ISBN 978-3-901509-91-9, CDROM version, Ed. B. Katalinic, Published by DAAAM International, Vienna, Austria, EU, 2012, the article "Effect of Process Parameters on Surface Roughness in Hammer Peening and Deep Rolling" by M. Steitz, J. Scheil, C. Müller, P. Groche, Key Engineering Materials, ISSN: 1662-9795, Vols. 554-557 pp 1887-1901 https://www.scientific.net/KEM.554-557.1887,© 2013 Trans Tech Publications Switzerland the article "Improving wear resistance of functional surfaces using the machine hammer peening technique", by M. Rodriguez Ripoll, F. Heindl, C. Lechner, C. Habersohn, M. Jech and F. Bleicher, appearing in Tribology—Materials Surfaces & Interfaces•March 2014, DOI: 10.1179/1751584X14Y.0000000063

Dissertation "Surface treatment of forming tools by hammering out" by Dr. Johannes Wied, Technische Universität Darmstadt, published at the URL http://tuprints.ulb.tu-darmstadt.de/2487/

Schulze, V. et al. "Surface modification by machine hammer peening and burnishing", CIRP annals manufacturing technology, Volume 65, Issue 2, 2016, pages 809-832, see also URL: https://publikationen.bibliothek.kit.edu/1000060939

The invention makes it possible to remove, in work step b) of the method according to the invention, at least 90% of the compound layer present after work step a) on the section of the free surface of the mould part processed in work step b). Thus, practical tests have confirmed that, in the case of the approach according to the invention, at least 95% of the compound layer present in the section processed in each case has generally been removed.

BRIEF DESCRIPTION OF THE DRAWINGS

The invention is explained in more detail in the following with reference to a drawing representing an exemplary embodiment. The schematic drawings show the following:

FIG. 2a-f are surface sections of the mould part according to FIG. 1, which have been subjected to processing according to the invention, in each case in a plan view;

FIG. 3 is the mould part in a view from above;

DESCRIPTION OF THE INVENTION

The mould part W (water jacket core) provided to cast an engine block for a combustion engine in a pressure casting mould has been manufactured in a conventional manner by machining from a steel block that consisted of the steel 1.2340 ("E38K").

The mould part W provided in this manner has been held in a conventionally performed gas nitriding process under a correspondingly conventionally composed NH3 containing nitriding atmosphere.

An edge layer R adjoining the surface O of the mould part W has resulted on the mould part by means of the gas nitriding. The edge layer R comprises a diffusion layer D, whose hardness is increased by nitrogen atoms diffused into this diffusion layer D compared to the hardness of the core material K of the mould part W.

Figure 6:
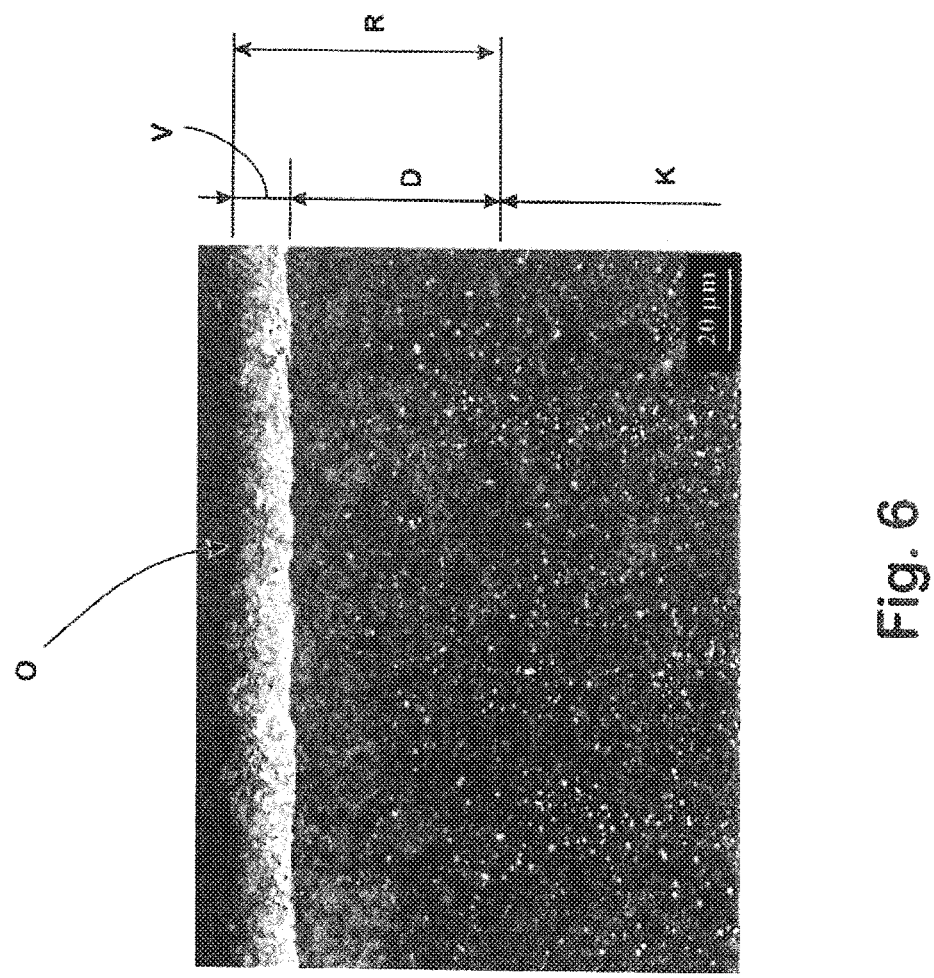
FIG. 6 is a section of a cut of a near-surface cross-sectional region of the mould part in the nitride-hardened state.
Figure 8A:
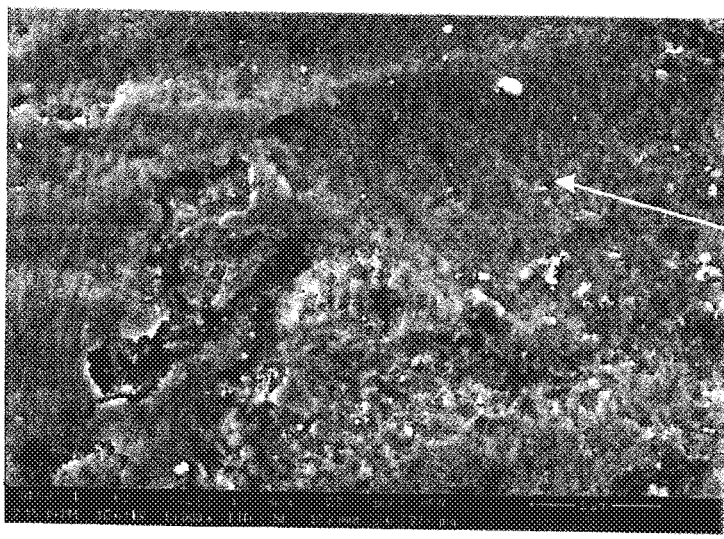
FIG. 8a is a scanning electron microscope image of a surface cut-out of a mould part treated according to the invention.

In addition, the edge layer R comprises a compound layer V, which is present after gas nitriding on the surface O of the mould part W and covers the diffusion layer D of the edge layer R (FIG. 6). In FIG. 8c, this compound layer V is discernible as the white coating ("white layer") completely covering the surface section shown there.

After the nitriding treatment, the mould part W was placed into a conventional pressure casting mould in a test operation. Under the standard operational conditions, engine blocks were then cast using said mould part in the pressure casting mould. In this case, the mould part W regularly underwent temperature fluctuations of 111-377° C. The cycle time was 100 s.

Figure 1:
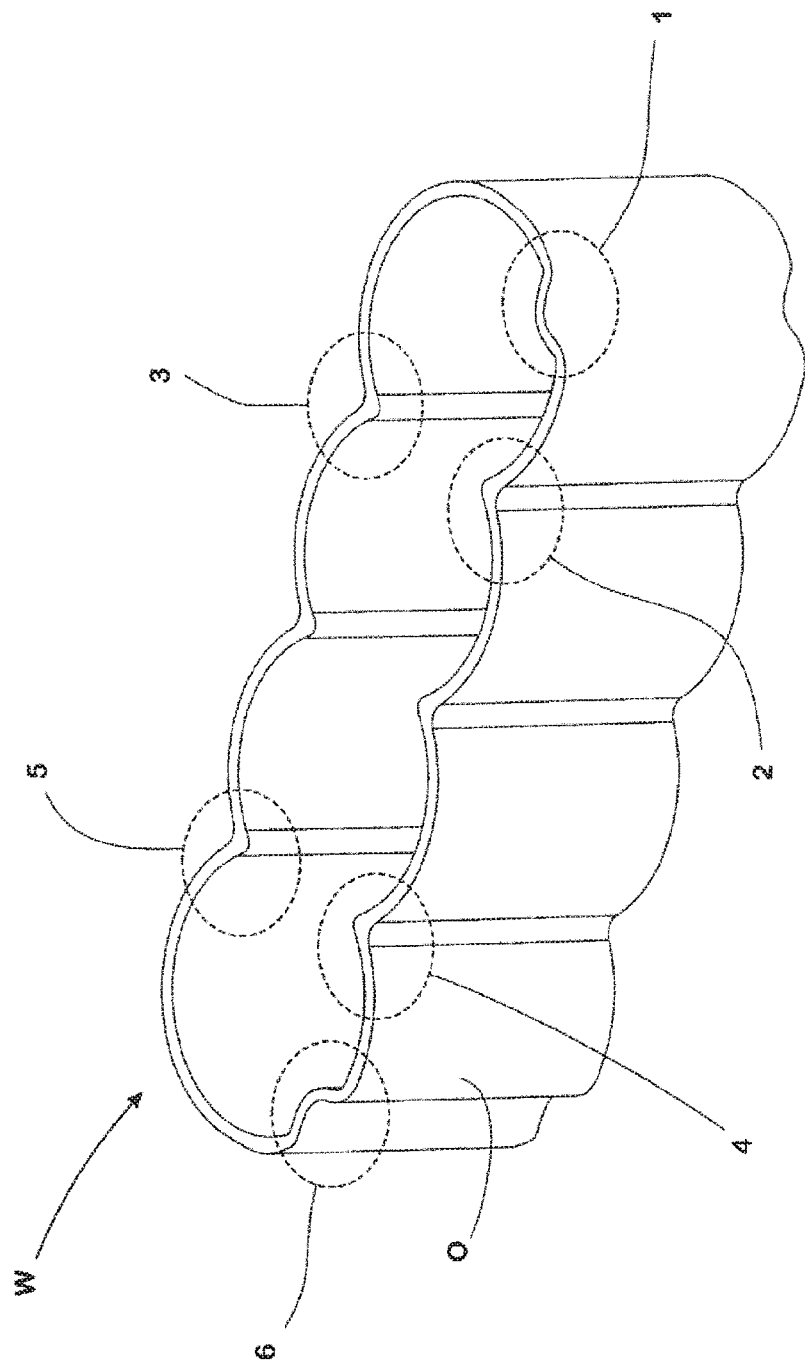
FIG. 1 is a mould part, which serves as a water jacket core for the casting-related manufacture of an engine block for a combustion engine in a perspective view.

After a usage duration of 10,000 shots, i.e. 10,000 cast parts, the free surfaces O of the mould part W were examined for crack formation on their inner and outer side. The sections 1-6 of the surfaces O have been found to be critical, with both the surface sections on the inner side "internal" and on the outer side "external" being affected in these sections (see FIGS. 1 and 3).

In order to avoid such crack formations, the sections 1-6 internal and 1-6 external have been processed with a hammer tool S in the case of a further embodiment of the mould part W following an edge layer hardening also carried out in the above-described manner. A standard hammer tool S was also used, as has been used already in the case of the methods which are described in the above-mentioned articles. An example of a specific embodiment for such a tool is represented in WO 2007/016919 A1. Therefore, only the elements of this tool S required for the understanding of the invention are explained here.

The hammer tool S accordingly had a plunger 10, which has, at its free end, a spherical insert 11 made of carbide material as the hammer head, which has a spherically bulged impact surface 12, with which the hammer tool S impacts on its impact surface in the surface section 1-6 processed in each case during the processing. The plunger 10 is mounted in axial slide bearings 13, 14 such that it carries out a linear movement along a movement axis X aligned coaxially thereto.

Figure 4C:
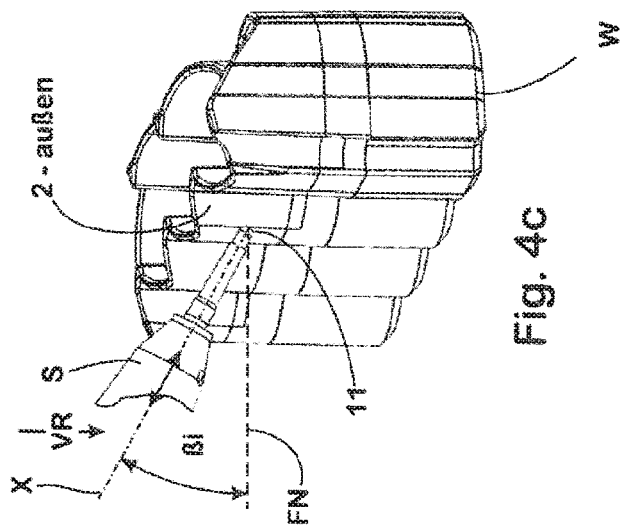
FIG. 4c is the mould part in the case of processing of the surface section by the hammer tool in a perspective view.
Figure 4B:
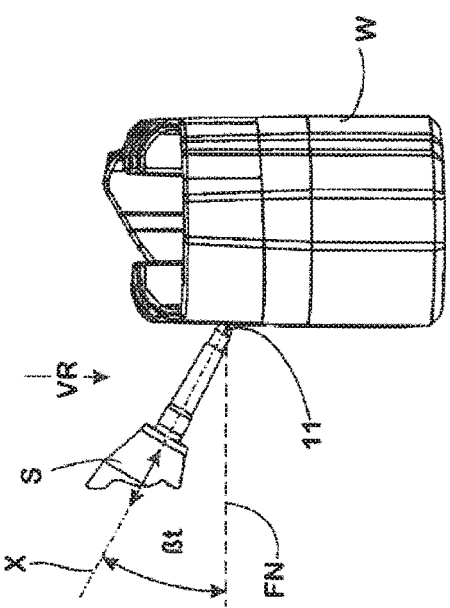
FIG. 4b is the mould part in the case of processing of the surface section by the hammer tool in a frontal view on the end face of the moulded part.
Figure 4A:
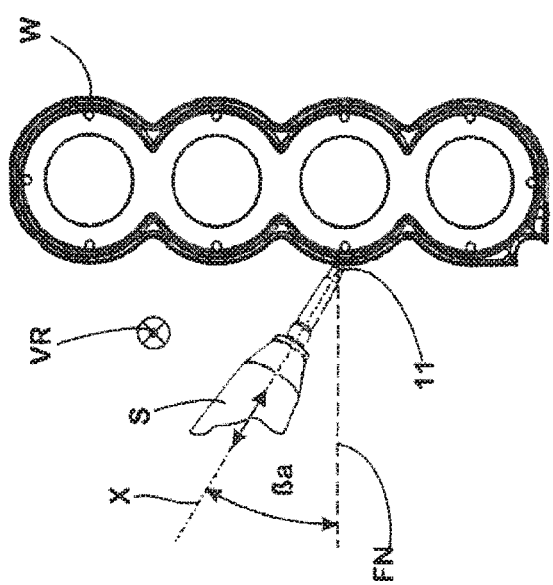
FIG. 4a is the mould part in the case of processing of one of its surface sections represented in FIG. 2 by a hammer tool in a view from above.
Figure 5:
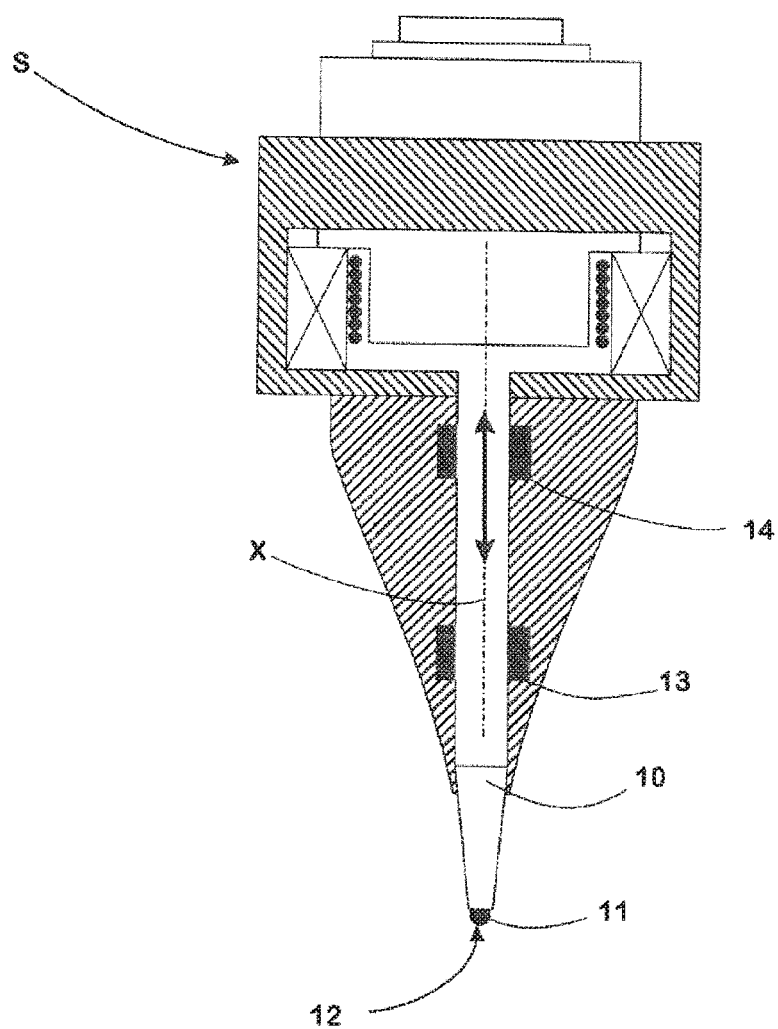
FIG. 5 is a hammer tool used for processing sections of the surface of the mould part according to FIG. 1 in a longitudinal section.

For the purposes of processing taking place on the inner ("internal") and on the outer ("external") side of the surface sections 1-6, the hammer tool S has been aligned in relation to the respective surface section 1-6 such that the movement axis X of its impact movement formed angles (tilt angle βt, working angle βa, impact angle βi) with the surface normal FN on the respective section 1-6 "internal"/"external", which were in the range of 25° to 45° in each case. (FIGS. 4a-4c)

The parameters of the MHP processes carried out on the individual surface sections 1-6 are indicated in Table 1.

Figure 10:
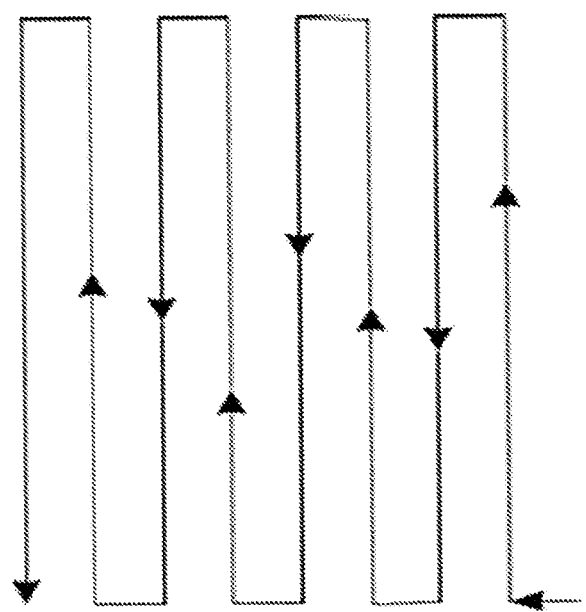
FIG. 10 is a schematic representation of the course of the tracks P, PV in the processing of the examples.

The other essential operating parameters of the hammer tool S are listed in Table 2, with the time required for the processing of the respective surface section 1-6 being designated with the cycle-time. The course of the tracks P, PV are meander shaped as shown in FIG. 10.

In the case of the processing, the hammer tool S was guided in a meander-shaped track P uninterrupted over the respectively processed section 1-6 of the free surface O of the mould part W.

Figure 7A:
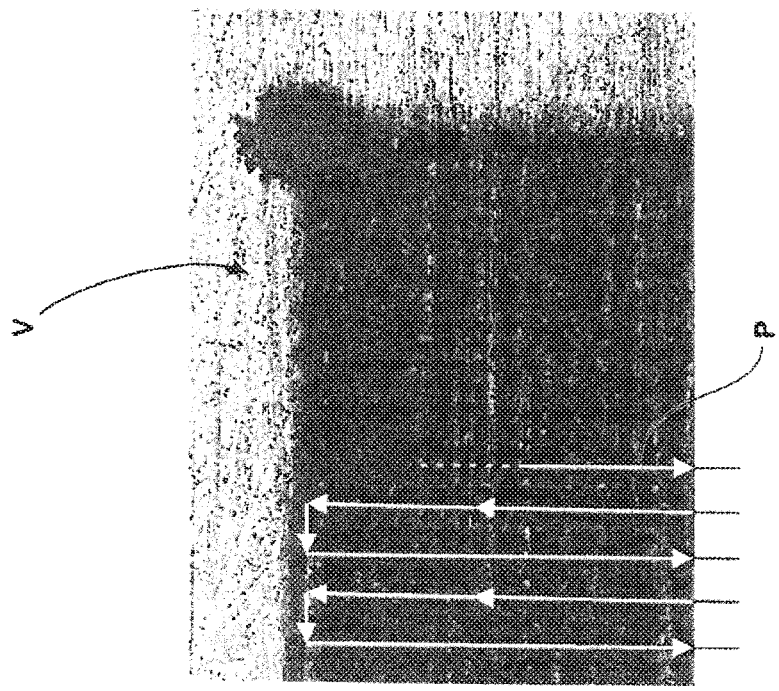
FIG. 7a,7b are an enlarged representation of surface sections after processing by means of machine hammer peening.

FIG. 7a shows a representative enlarged cut-out of one of the surface sections 2 internal, 3 external and 4 external, in the case of which the movement axis X of the tool S was aligned at an angle of 30° to the surface normal FN on the respective surface section. The meander sections of the track P travelled by the tool S overlapping one another over a respectively 0.1 mm-wide overlapping region are clearly discernible just like the fact that the white compound layer V in the dark looking region processed according to the invention has been largely completely i.e. up to at least 95% removed by the machine hammer peening using the hammer tool S.

For comparison, the hammer tool S has been aligned perpendicular (angles βt, βa, βi=0) to the respectively processed surface section on the surface sections 2 external and 5 external of the cooling jacket W such that the movement axis X coincides with the surface normal FN. The parameters of the comparative processing are otherwise consistent with the parameters indicated in Table 2.

Figure 7B:
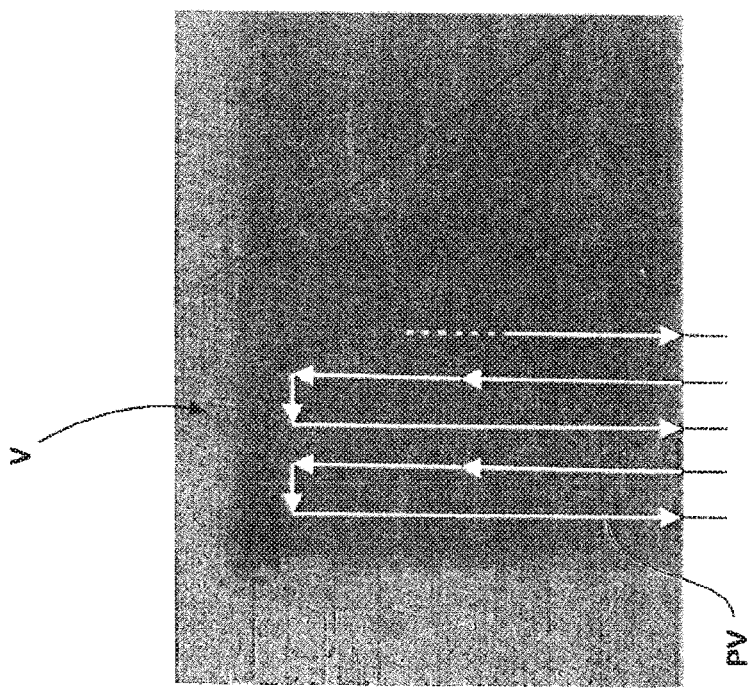

It is discernible from FIG. 7b that in the case of the surface section processed in this manner, although the surface section which the hammer tool S has processed following a track PV is also visible by the dark colouring, the region processed by the tool S is still covered by the white compound layer V. Accordingly, unlike the surface section represented in FIG. 7a and processed according to the invention, there is still the danger that microcracks are formed in the nitride layer which form the start for cracks penetrating into the mould part 2.

FIG. 8c shows a surface section of the mould part W directly after gas nitriding. The compound layer V can be discerned as a white coating there, which covers the entire surface section.

Figure 8B:
FIG. 8b is a scanning electron microscope image of a surface cut-out of a mould part not treated according to the invention.
Figure 8C:
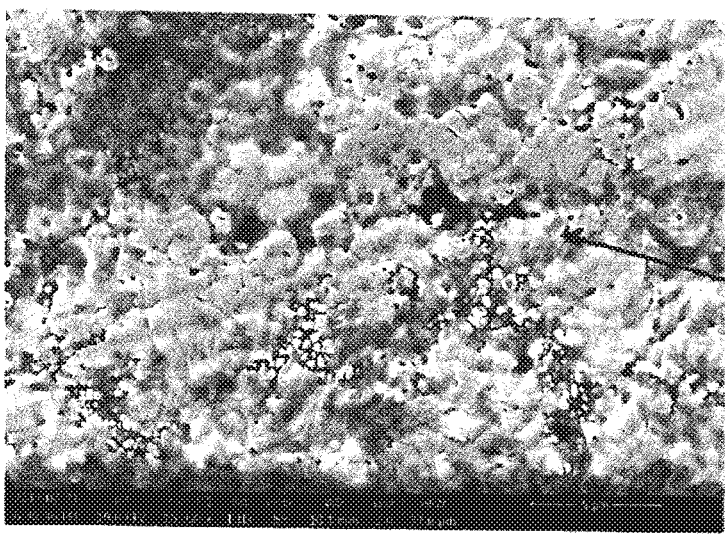
FIG. 8c is a scanning electron microscope image of a surface cut-out of a mould part not treated after gas nitriding.
Figure 9C:
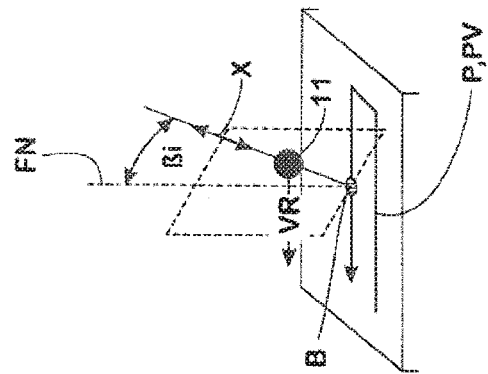
FIGS. 9a-9c are schematic representations of the position and alignment of the tilt angle $\beta t$, of the working angle $\beta a$ and of the impact angle $\beta i$.
Figure 9B:
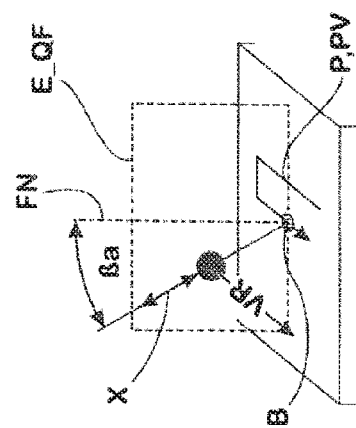
Figure 9A:
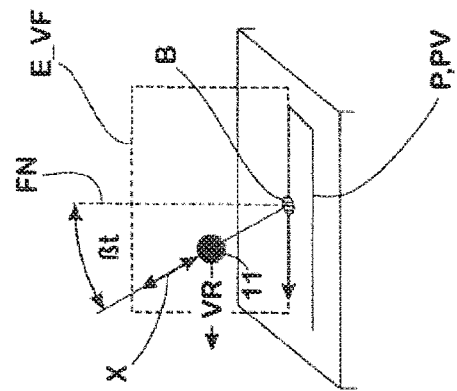

FIG. 8b shows a surface section of the mould part W after an MHP treatment, in the case of which the hammer tool S has been aligned perpendicular to the surface to be processed (β=0°). The white compound layer V has been visibly removed only incompletely there such that the darker looking surface of the diffusion layer D takes in only a smaller part of the represented surface section.

FIG. 8a shows a surface section of the mould part W following an MHP treatment carried out according to the invention, in the case of which the hammer tool S has been aligned at an angle of 45°. The substantially completely exposed darker surface of the diffusion layer D takes in the entire surface section here.

With the method according to the invention, mould parts for casting moulds for light metal casting can therefore be treated such that the danger of crack formation in the region of the surface sections of the mould part coming into contact with the light metal melt during casting is reduced to a minimum. This is achieved according to the invention in that in a work step a) by means of nitriding treatment on the mould part a nitride-hardened edge layer adjoining its free surface is generated which is harder than the inner core region of the mould part and comprises a diffusion layer adjoining the core region and a compound layer located on the diffusion layer and adjoining the free surface of the mould part and in that in a work step b) at least one section of the surface of the mould part is mechanically processed by machine hammer peening, in the case of which a hammer tool, which, at a certain impact frequency, carries out an impact movement along a movement axis which is aligned in relation to the free surface at a certain acute angle, is guided continuously over the free surface of the mould part following a track determined in a preceding design step such that the compound layer is removed by the impacting stress in the impact region of the hammer tool.

TABLE 1

| surface section | position | impact depth [mm] | β [°] | cycle time [s] | processed surface [mm$^2$] |
|---|---|---|---|---|---|
| 1 | internal | 0.35 | 25 | 411 | 804 |
| 1 | external | 0.35 | 25 | 438 | 809 |
| 2 | internal | 0.35 | 30 | 1158 | 2277 |
| 2 | external | 0.35 | 0 | 1104 | 2181 |
| 3 | internal | 0.35 | 40 | 356 | 711 |
| 3 | external | 0.35 | 30 | 502 | 547 |
| 4 | internal | 0.35 | 40 | 1145 | 2255 |
| 4 | external | 0.35 | 30 | 1090 | 2153 |
| 5 | internal | 0.35 | 40 | 1286 | 2140 |
| 5 | external | 0.35 | 0 | 1090 | 2153 |
| 6 | internal | 0.35 | 40 | 245 | 477 |
| 6 | external | 0.35 | 25 | 164 | 311 |

TABLE 2

| | | |
|---|---|---|
| impact frequency | 200 | Hz |
| stroke | 0.35 | mm |
| moving mass | 280 | g |
| travel speed | 1,200 | mm/min |
| distance of the impressions | 0.1 | mm |
| overlapping of the meander sections | 0.1 | mm |
| diameter of the ball insert 11 | 6 | mm |
| speed at which the hammer tool is moved along the track P, PV | 1200 | mm/min |

REFERENCE NUMERALS

βa working angle
β1 impact angle
βt tilt angle
B contact point of the hammer head 11 with the surface O, to be processed, of the mould part W
D diffusion layer
E_VF plane "travel direction-surface normal"
E_QV normal to the surface to be processed and transverse to the plane aligned in the travel direction VR
FN surface normal
K core region of the mould part W
O surface of the mould part W
P,PV track followed by the hammer tool S during the processing
R nitride-hardened edge layer
S hammer tool
W compound layer
VR travel direction of the hammer tool S along the respective track P, PV
W mould part (water jacket core)
X movement axis of the hammer tool S
1-6 sections of the free surface O of the mould part W
10 plunger
11 ball-shaped insert (hammer head)
12 impact surface
13,14 slide bearing

The invention claimed is:

1. A of treating the surfaces of mould parts consisting of a steel material for casting moulds which are provided for the casting-related manufacture of cast parts from a light metal melt, comprising the following work steps:

a) Nitrate treating the mould part to generate a nitride-hardened edge layer adjoining the free surface of the mould part which has a greater hardness than the inner core region of the mould part and comprises a diffusion layer adjoining the core region and a compound layer located on the diffusion layer and adjoining the free surface of the mould part;

b) mechanical processing of at least one section of the free surface of the mould part, wherein the mechanical processing is carried out by machine surface hammering, in the case of which a hammer tool, which performs an impact movement along a movement axis at a certain impact frequency, said movement axis being aligned in relation to the free surface at a determined acute angle, is guided continually over the free surface of the mould part following a track determined in a preceding design step such that the compound layer is removed by the impact stress in the impact region of the hammer tool.

2. The method according to claim 1, characterised in that the nitride treatment is carried out as gas nitriding, in the case of which the mould part is held under a nitrogen-containing atmosphere, as bath nitriding or as plasma nitriding.

3. The method according to claim 1, characterised in that the hammer tool has a spherically vaulted impact surface, with which the hammer tool impacts the mould part.

4. The method according to claim 3, characterised in that the hammer tool consists of a carbide material at least on its section impacting the surface to be processed.

5. The method according to claim 4, characterised in that the hammer tool has a hardness of at least 2000 HV on its section consisting of carbide material.

6. The method according to claim 1, characterised in that the movement axis of the hammer tool forms an angle of 15-50° with a surface normal established on the respectively processed section of the free surface of the mould part.

7. The method according to claim 6, characterised in that the angle formed is 20-45°.

8. The method according to claim 7, characterised in that the angle formed is 30°±7°.

9. The method according to claim 1, characterised in that the impact frequency of the hammer tool is 20-500 Hz.

10. The method according to claim 1, characterised in that the stroke of the impact movement performed by the hammer tool is up to 2 mm.

11. The method according to claim 1, characterised in that in work step b) at least 90% of the compound layer present after work step a) on the section of the free surface of the mould part processed in work step b) is removed.

12. The method according to claim 1, characterised in that the impression distance of the impressions generated by the hammer tool on the free surface is >0 to 1 mm.

13. The method according to claim 1, characterised in that the travel speed, at which the hammer tool is moved, is 400-6,000 mm/min.

14. The method according to claim 1, characterised in that the track, which the hammer tool follows in work step b), runs in the manner of a meander pattern or in the manner of a spiral pattern.

15. The method according to claim 1, characterised in that the hammer tool is guided by a numerically-controlled adjustment device with two or more movement axes along the previously specified track.

\* \* \* \* \*

UNITED STATES PATENT AND TRADEMARK OFFICE
CERTIFICATE OF CORRECTION

PATENT NO. : 11,124,866 B2  
APPLICATION NO. : 16/765214  
DATED : September 21, 2021  
INVENTOR(S) : Scheil et al.

Page 1 of 1

It is certified that error appears in the above-identified patent and that said Letters Patent is hereby corrected as shown below:

On the Title Page

Column 1, item (72) Inventors, Line 1, delete "Darmstradt" and insert -- Darmstadt --

In the Claims

Column 11, Line 62, Claim 1, delete "A of" and insert -- A method of --

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*